（12） United States Patent
Sult

(10) Patent No.: US 10,086,572 B2
(45) Date of Patent: Oct. 2, 2018

(54) COMPOSITE SHEET WITH VISIBLE FILLER AND MANUFACTURING METHOD

(75) Inventor: Darrell B. Sult, Zeeland, MI (US)

(73) Assignee: Spectra Design, Inc., Hudsonville, MI (US)

(*) Notice: Subject to any disclaimer, the term of this patent is extended or adjusted under 35 U.S.C. 154(b) by 0 days.

(21) Appl. No.: 12/685,379

(22) Filed: Jan. 11, 2010

(65) Prior Publication Data

US 2010/0120964 A1 May 13, 2010

Related U.S. Application Data

(63) Continuation of application No. 11/246,636, filed on Oct. 7, 2005, now Pat. No. 7,645,405.

(Continued)

(51) Int. Cl.

| | |
|---|---|
| *C08K 3/10* | (2018.01) |
| *B32B 5/16* | (2006.01) |
| *C08L 67/02* | (2006.01) |
| *C08L 67/00* | (2006.01) |
| *C08G 67/00* | (2006.01) |
| *B29C 70/58* | (2006.01) |
| *B29B 7/86* | (2006.01) |
| *B29B 7/90* | (2006.01) |
| *B29C 35/02* | (2006.01) |
| *B29C 43/00* | (2006.01) |
| *B29C 43/02* | (2006.01) |

(Continued)

(52) U.S. Cl.
CPC ............. *B29C 70/58* (2013.01); *B29B 7/86* (2013.01); *B29B 7/90* (2013.01); *B29C 35/02* (2013.01); *B29C 43/003* (2013.01); *B29C 43/021* (2013.01); *B29C 2791/001* (2013.01); *B29C 2793/00* (2013.01); *B29K 2033/08* (2013.01); *B29K 2067/00* (2013.01); *B29K 2105/24* (2013.01); *B29K 2105/243* (2013.01); *Y10T 428/2982* (2015.01)

(58) Field of Classification Search
USPC ................................................ 428/15; 264/40
See application file for complete search history.

(56) References Cited

U.S. PATENT DOCUMENTS 3,629,041 A * 12/1971 Shobert .......................... 156/267
3,900,357 A *  8/1975 Huchette et al. ............. 156/185
(Continued)

FOREIGN PATENT DOCUMENTS

FR         2825266 A1     12/2002

OTHER PUBLICATIONS

English abstract of FR 2825266, Dec. 2002.*

*Primary Examiner* — Ronak C Patel
(74) *Attorney, Agent, or Firm* — The Watson IP Group, PLC; Jovan N. Jovanovic; Vladan M. Vasiljevic

(57) ABSTRACT

A solid surface sheet includes visible, elongated, shredded cuttings uniformly distributed throughout a matrix wherein the cuttings and the matrix have substantially the same specific weight and wherein a majority of the cuttings are substantially elongated. Related methods are also disclosed including shredding a first mix while in a gel state, curing the cuttings, sorting by size, and using as a filler in a base material to form a blend having a unique appearance and high internal strength. The preferred material is polyester or acrylic. The solid surface sheet can be used as a countertop, floor or wall panel, furniture, and in similar applications.

14 Claims, 5 Drawing Sheets

Related U.S. Application Data

(60) Provisional application No. 60/649,626, filed on Feb. 2, 2005.

(51) Int. Cl.
    *B29K 33/00*     (2006.01)
    *B29K 67/00*     (2006.01)
    *B29K 105/24*   (2006.01)

(56) References Cited

U.S. PATENT DOCUMENTS

| | | | |
|---|---|---|---|
| 3,917,790 A * | 11/1975 | Oswitch et al. | 264/267 |
| 5,244,941 A * | 9/1993 | Bruckbauer et al. | 523/171 |
| 5,507,845 A * | 4/1996 | Molnar et al. | 47/1.01 R |
| 6,605,661 B2 * | 8/2003 | Hamami | 524/439 |
| 6,743,327 B2 * | 6/2004 | Schober | 156/308.2 |
| 2003/0031832 A1 * | 2/2003 | Olson et al. | 428/156 |
| 2003/0234071 A1 * | 12/2003 | Domanico | 156/71 |
| 2004/0126571 A1 * | 7/2004 | Bordener | 428/327 |

* cited by examiner

COMPOSITE SHEET WITH VISIBLE FILLER AND MANUFACTURING METHOD

CROSS-REFERENCE TO RELATED APPLICATION

This application is a continuation of U.S. patent application Ser. No. 11/246,636 filed Oct. 7, 2005, now U.S. Pat No. 7,645,405 entitled COMPOSITE SHEET WITH VISIBLE FILLER AND MANUFACTURING METHOD which claims benefit of provisional application Ser. No. 60/649,626, filed Feb. 2, 2005, entitled COMPOSITE COUNTERTOP AND METHOD OF MANUFACTURE under 35 U.S.C. 119(e), the entire specification of both of which is hereby incorporated by reference.

BACKGROUND

The present invention concerns a solid composite sheet with visible elongated filler and a method of manufacturing the same.

Various materials including wood, ceramic tiles, and Formica® have been used to make countertops. In recent years, solid surface materials have become highly desirable because of their non-porous and homogeneous nature. To meet the demanding requirements of consumers with varying tastes, different designs and textures have been developed including different fillers used in the process of making solid surface materials. For example, fabricators have used both aluminatrihydrate as a filler and also recycled solid surface particulate materials by grinding them up into granules and reincorporating them into a new solid surface material. Some fabricators have even utilized other materials such as chips and shavings of non-ferrous metals (see Hamami U.S. Pat. No. 6,605,661). However, the heterogeneous nature of this last construction can substantially weaken the solid surface material due to voids that may occur, and due to poor bonding of the polyester base material to non-ferrous filler material. As a result of the poor bonding and different material strengths and due to odd particulate shapes that may trap air, chips and surface defects may be in the top surface of a sheet of this material as it is sanded and buffed to a final high-quality finish. Also, the need for other designs has become increasingly important.

Consequently, a solid surface material having the aforementioned advantages, yet incorporating a different design pattern while maintaining a high internal strength and low tendency for producing surface defects, is desired.

SUMMARY OF THE PRESENT INVENTION

In one aspect of the present invention, a solid surface sheet includes a matrix of material forming a sheet. Elongated, shredded cuttings are distributed throughout the matrix, wherein the cuttings and the matrix have substantially the same specific weight and wherein a significant visible number of the cuttings are elongated on a show surface side of the sheet.

In another aspect of the present invention, a method for making cuttings for use in a solid surface sheet includes providing a matrix in a mold cavity. The matrix is removed from the mold when the matrix has cured to a flexible gel state allowing the matrix to be handled. The matrix is then fed into cutters to make flexible gelled cuttings. The flexible gelled cuttings are spread into a curing chamber, and then the flexible gelled cuttings are cured in the curing chamber.

In yet another aspect of the present invention, a method for making a solid surface sheet includes curing a thermosettable resin (such as polyester or acrylic) to a gel state. The resin is fed into cutters to form elongated cuttings. The cuttings are cured to a solid state and then added to a fluid matrix to form an amalgamated blend, which is then formed and processed into a solid surface sheet with finished show surface.

In still another aspect of the present invention, a method includes providing a sheet of material cured only to a flexible but handleable partially cured state, the material being selected from a group consisting of polyester and acrylic polymer, and cutting the sheet into sliced elongated strips that are at least three times their greatest cross-sectional width.

These and other aspects, objects, and features of the present invention will be understood and appreciated by those skilled in the art upon studying the following specification, claims, and appended drawings.

BRIEF DESCRIPTION OF DRAWINGS

FIGS. 1A-5A are line drawings replicating the photographs of FIGS. 1-5, respectively.

PRIOR ART

Figure 1:
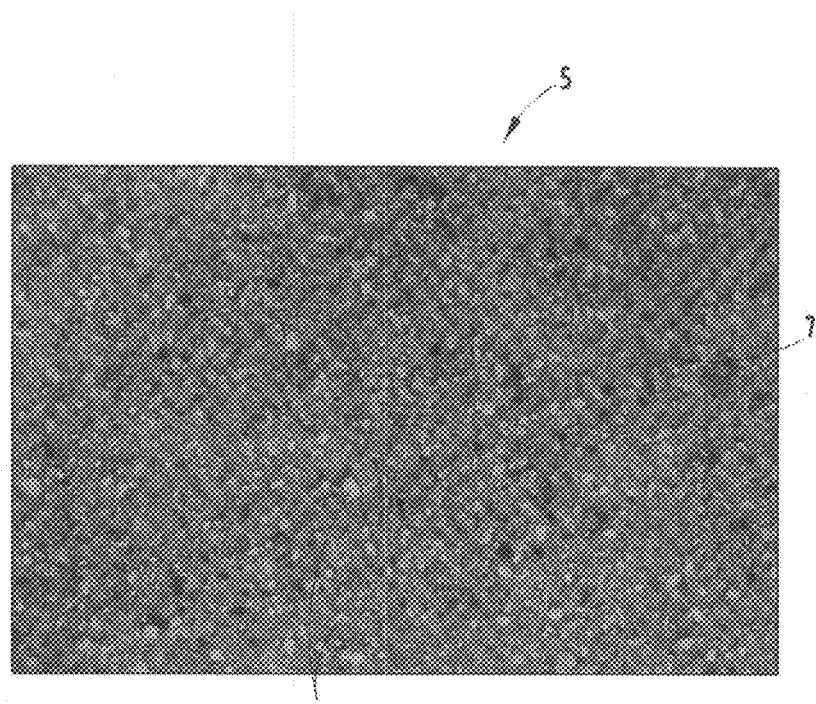
FIG. 1 shows the prior art including polyester granules in the matrix of the solid surface material.
Figure 1A:
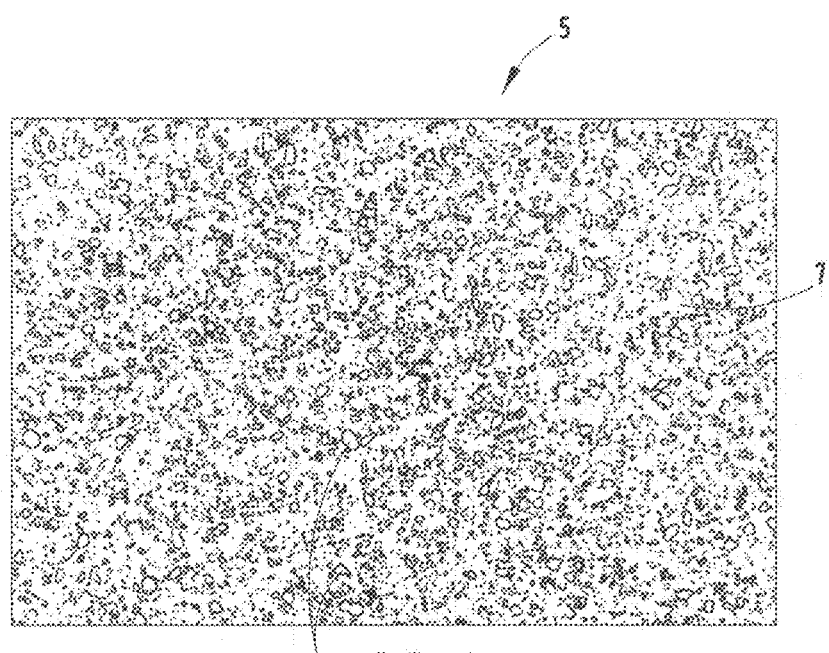

The reference numeral 5 (FIG. 1) generally designates a block of prior art solid surface material. The illustrated block 5 includes a resin made of unsaturated polyester 7, and filler in the form of aluminatrihydrate, a catalyst, a pigment, and a colorant. To add texture to the appearance of the solid surface material, small polyester granules 9 have been added to the matrix. The polyester granules 9 are obtained through recycling of polyester slabs. Polyester slabs are fed into a grinding mill that breaks them down, resulting in the formation of polyester granules 9. Notably, the granules tend to be "chunks" or chips of material that are not elongated, but instead are more "ball-shaped." The filler and particulates are added to a base resin and cured to make a solid surface material, with at least one side processed to form a show surface, such as for a countertop.

DETAILED DESCRIPTION OF PREFERRED EMBODIMENTS

Figure 5:
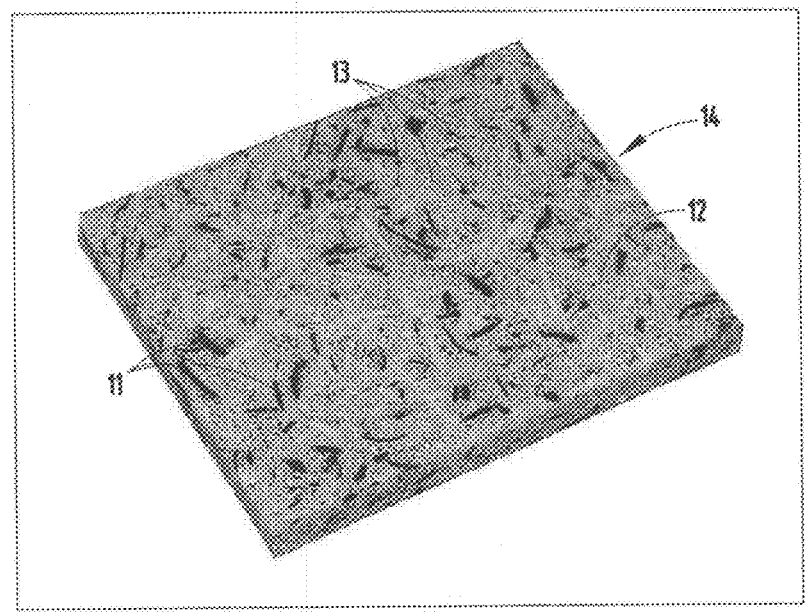
FIG. 5 is a top perspective view of FIG. 4.
Figure 5A:
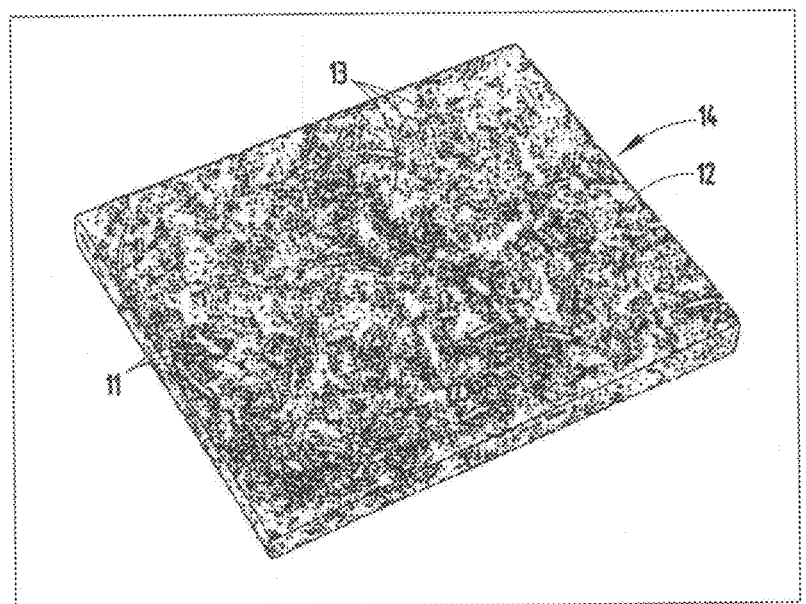

For purpose of description herein the terms "upper", "lower", "right", "left", "rear", "front", "vertical", "horizontal" and derivatives thereof shall relate to the invention as oriented in FIG. 5. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
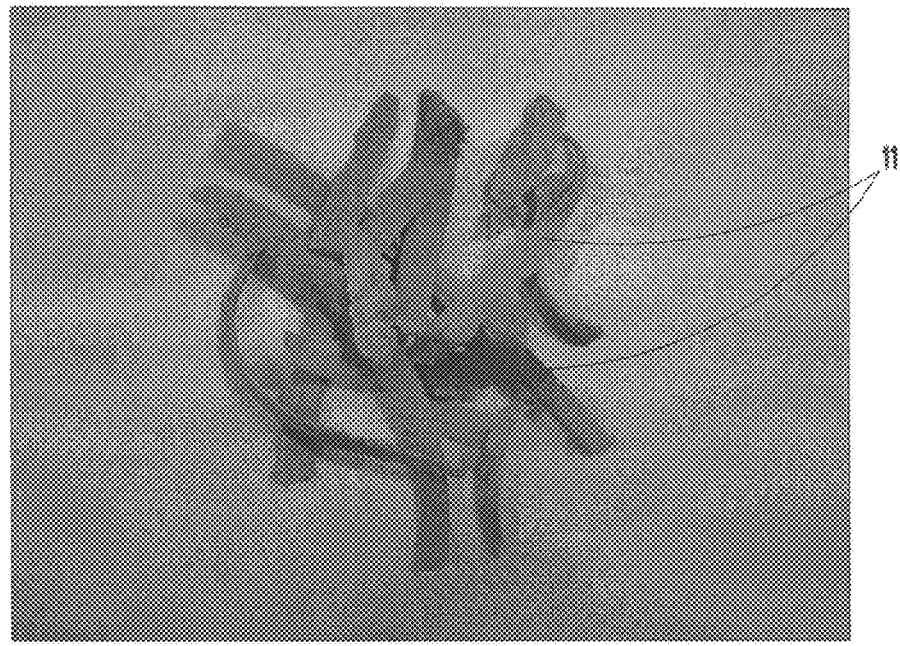
FIG. 2 shows cuttings of the present invention.
Figure 2A:
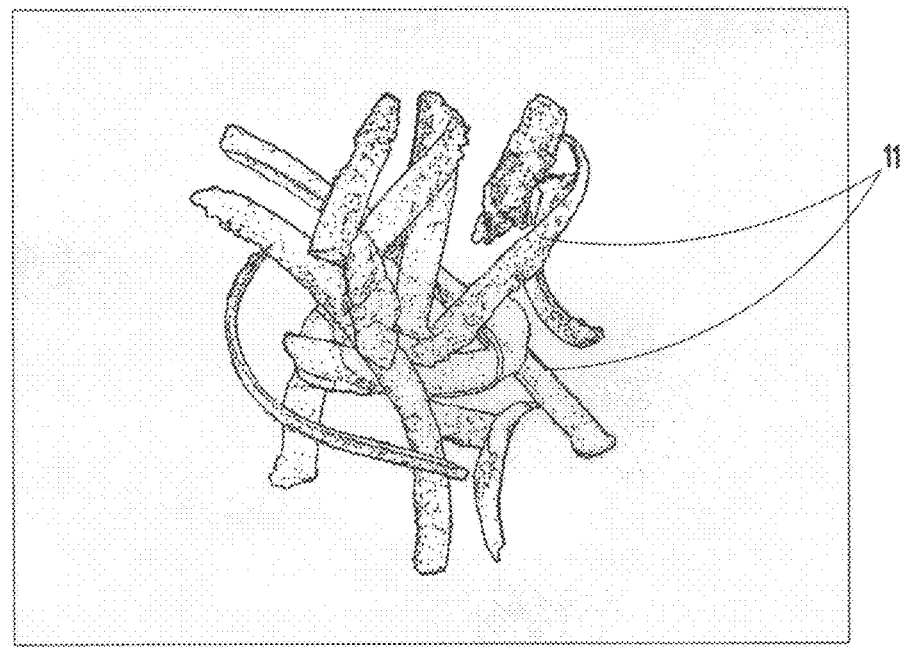

FIG. 2 illustrates elongated shredded polyester cuttings 11 sliced/cut from an unsaturated polyester in a gel state prior to the polyester curing. To make such cuttings 11, a predetermined amount of resin is poured into a mixer. A filler is added, if desired, such as by adding aluminatrihydrate particulate or granules 13 to the mixer. The blend (also called a "matrix" herein) is mixed with the resin until the filler is satisfactorily completely wet-out and there are no lumps or powder remaining. Colorant and pigment are added, if required, while the mixture of resin and filler continues to be mixed. The mixer is then closed and vacuum is pulled from the mixer for a predetermined duration of time. Upon completion of that duration of time, the lid is opened and the catalyst is added (i.e., methylethylketone peroxide). After the catalyst has been added, the lid is again closed and vacuum is again pulled from the mixer. After vacuum has been pulled from the mixer for a predetermined second amount of time, a matrix is formed in the mixer.

Figure 3:
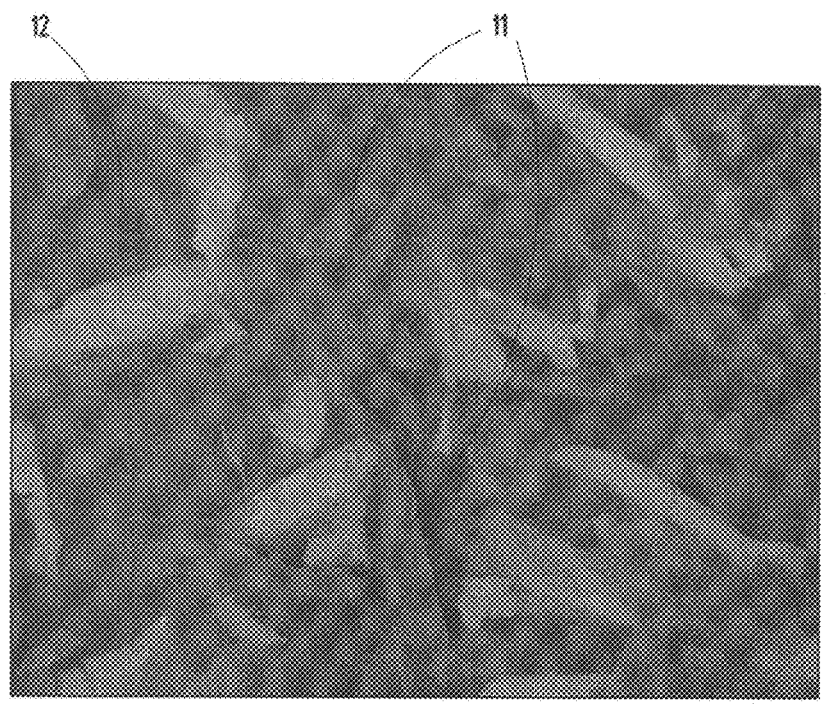
FIG. 3 is an illustration of one embodiment of the present invention.
Figure 3A:
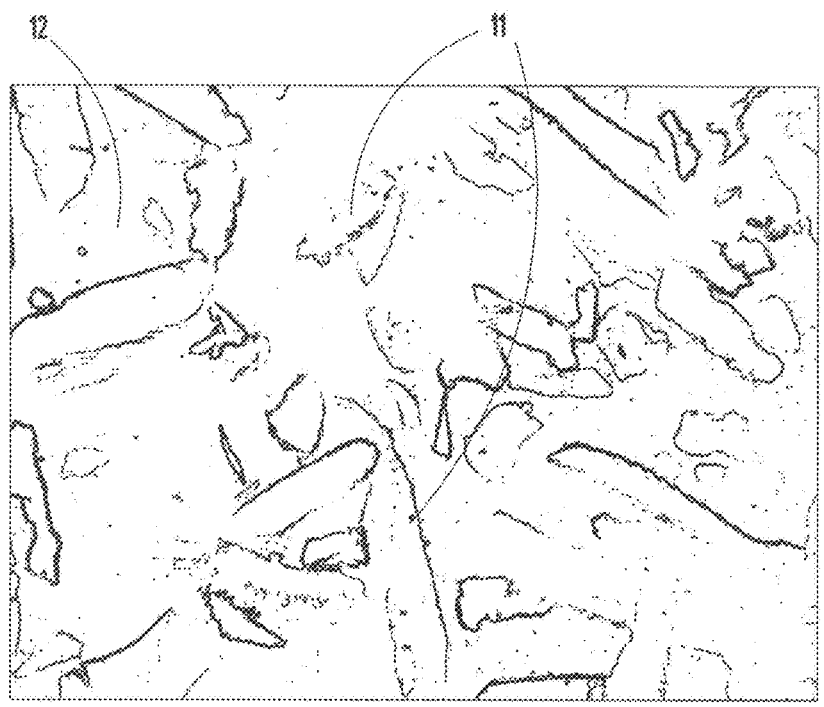
Figure 4:
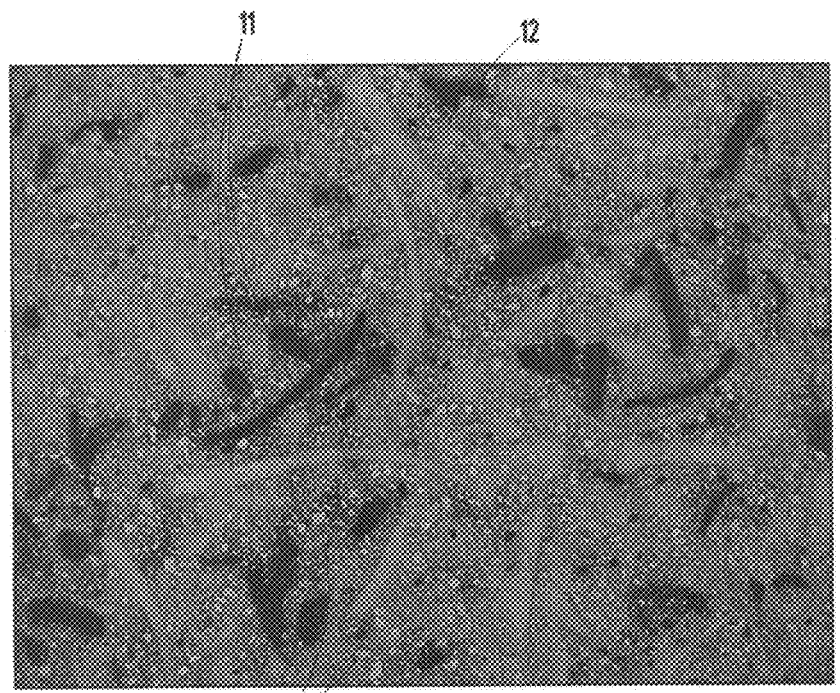
FIG. 4 is an illustration of another embodiment of the present invention.
Figure 4A:
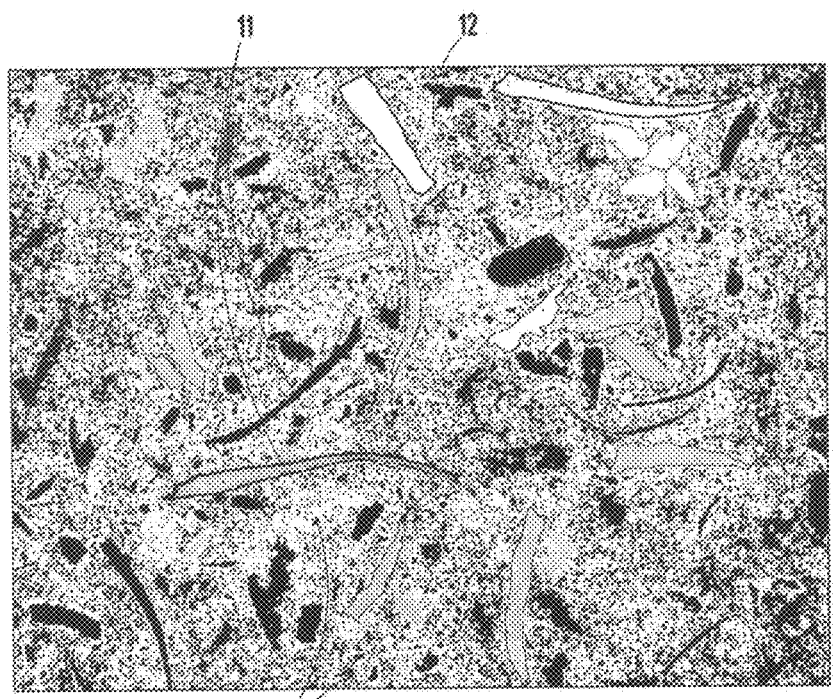

The matrix is then poured into mold cavities and the temperature and time is monitored to determine when the blend is cured enough to form a flexible gel that can be handled. The flexible gel preferably has a consistency similar to refrigerated Colby cheese, such that it can be handled and cut with a "cheese" shredder. Once a complete gel set has been reached, the matrix is removed from the mold and fed into cutters. The cutters act similarly to a cheese slicer in that they shred the matrix forming elongated shaped cuttings 11 of unsaturated polyester 7. The cuttings 11 are not allowed to cool, and are immediately spread into a curing chamber and cured at the correct temperature for the required amount of time. The temperature is then raised during the post-curing time, and afterwards, the cuttings 11 are brought back to ambient temperature. Typically the cuttings 11 are then screened or air-qualified into required sizes. The new cuttings 11 can be advantageously used as filler in the production of a new solid surface material, or more specifically, a solid surface sheet, providing a highly novel and new appearance (examples of which are shown in FIGS. 3-5). It is noted that the present fillers can be virtually any shape, size, length, profile, color, and/or appearance. Yet, the present fillers provide excellent bonding, do not tend to lead to surface defects (since the material of the filler is the same as the base material of the countertop). Preferably, the cuttings 11 are the same specific weight as the matrix material 12, and are of the same polymeric chemistry for optimal bonding.

FIG. 3 illustrates a solid surface material incorporating the cuttings 11 of the aforementioned process into the matrix of the solid surface material 12. A majority of the cuttings 11 are substantially linear and about ½ to 1 inch long, although some smaller cuttings 11 or longer cuttings 11 may be present. It is contemplated that the length, curvature and shape of the cuttings 11 can be varied as desired. Preferably they are long enough (such as at least twice as long as wide, or more preferably at least 3-4 times their width . . . or up to an inch long or longer) so that their appearance is distinctive and appealing.

FIG. 4 illustrates a second embodiment of the present invention wherein solid surface material has both granules 13 and elongated cuttings 11 present in the matrix of the solid surface material 12. In this instance, the granules 13 are added at the same time as the elongated cuttings 11, prior to molding the matrix into a sheet of solid surface material. Once the sheet has been formed, cured, and properly hardened, the sheet can then be processed into a countertop, wall panels (such as may be used in luxurious lobbies or bathrooms), flooring, table tops, furniture, and many types of commercial fixtures/surfaces.

FIG. 5 depicts a slab 14 of the solid surface material of the second embodiment of the present invention. It may be of varying dimensions with varying amounts of resin, cuttings 11, and/or granules 13.

The present inventive concepts can be used on other materials. For example, where a solid surface might be made of a different curable thermoset resin other than polyester, that particular curable resin can be cured to a gel state sufficient for handling, shredded/cut to desired elongated shapes, cured, and then added as filler to a base mix to make a blend with a novel desired appearance. For example, this present inventive method can be done with acrylic materials. It is also contemplated that the present novel filler might be used with other materials to provide a unique appearance and set of properties.

It is to be understood that variations and modifications can be made on the aforementioned structure and process without departing from the concepts of the present invention, and further it is to be understood that such concepts are intended to be covered by the following claims unless these claims by their language expressly state otherwise.

What is claimed is:

1. A particulate for incorporation into a matrix of material that is independently curable into a solid surface material, the particulate comprising: a plurality of separate, cured cuttings, having a shredded and elongated configuration, and a plurality of surfaces, defining a cutting surface area, substantially all of the cutting surface area having a shredded surface configuration, with the cured cuttings having a hardness above that which allows formation of a shredded surface configuration after curing.

2. The particulate of claim 1 wherein each cutting of the plurality of cuttings comprises at least one of polyester or acrylic.

3. The particulate of claim 2 wherein each cutting of the plurality of cuttings further comprises at least one filler.

4. The particulate of claim 1 wherein the matrix and the plurality of cuttings have substantially the same specific weight.

5. The particulate of claim 1, wherein the cuttings are cut from a thermoset polymeric material when it is partially cured to a gel.

6. The particulate of claim 1 wherein a plurality of the plurality of cuttings each have a length that is between ½ and 1 inch.

7. The particulate of claim 1 wherein a plurality of the plurality of cuttings each have a length at least three times greater than a width.

8. A solid surface material comprising:
a matrix including a resin; and
a particulate comprising a plurality of separate, cured cuttings, having a shredded and elongated configuration, and a plurality of surfaces, defining a cutting surface area, substantially all of the cutting surface area having a shredded surface configuration, with the cured cuttings having a hardness above that which allows formation of a shredded surface configuration after curing;
wherein the particulate is added to the matrix and the matrix is then cured to form the solid surface material.

9. The solid surface material of claim 8, wherein the cuttings are distributed throughout the matrix such that at least some of the cuttings are elongated on a show surface side of the sheet.

10. The solid surface material of claim 8, wherein the matrix and cuttings comprise thermoset materials.

11. The solid surface material of claim 8, wherein:
the cuttings comprise one of a polyester or acrylic; and
the matrix comprises one of a polyester or acrylic.

12. The solid surface material of claim 8, further comprising a plurality of granules distributed within the matrix.

13. The solid surface material of claim 8 wherein the matrix further includes a filler mixed with the resin.

14. The solid surface material of claim 8 wherein the solid surface material is processed into one of the group consisting of: a countertop, a wall panel, flooring, a table top, furniture, and a fixture.

* * * * *